March 17, 1925.
W. P. REIBOLDT
1,530,328
APPARATUS FOR MOLDING BURIAL VAULTS
Filed June 14, 1921    2 Sheets-Sheet 1
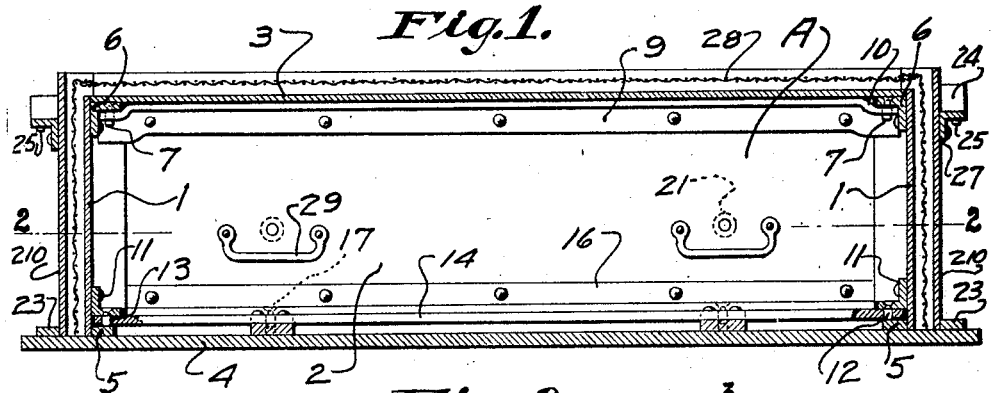
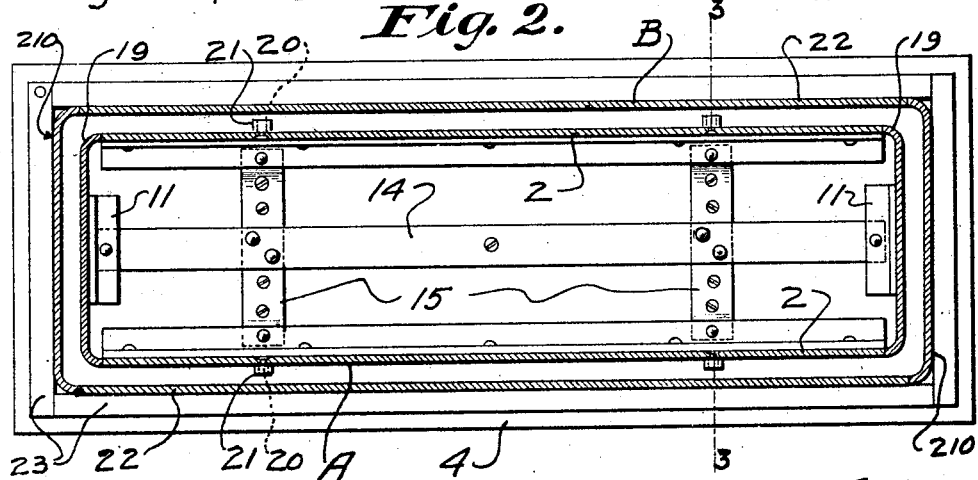
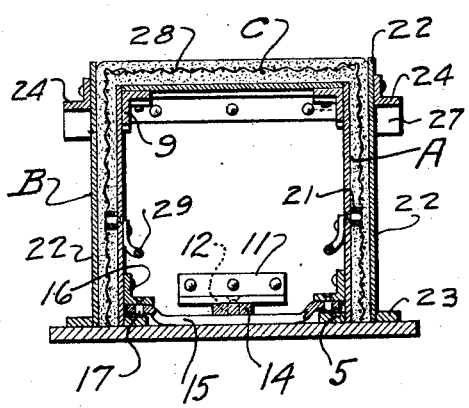
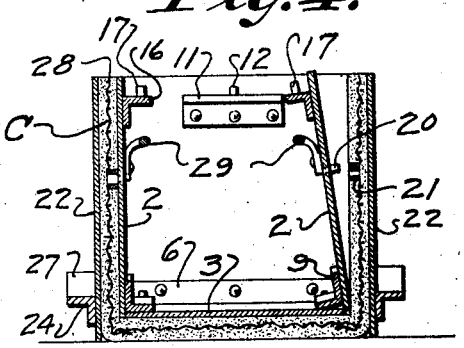
INVENTOR.
WILLIAM P. REIBOLDT
BY Everett Rook,
ATTORNEYS.

March 17, 1925.
W. P. REIBOLDT
1,530,328
APPARATUS FOR MOLDING BURIAL VAULTS
Filed June 14, 1921   2 Sheets-Sheet 2
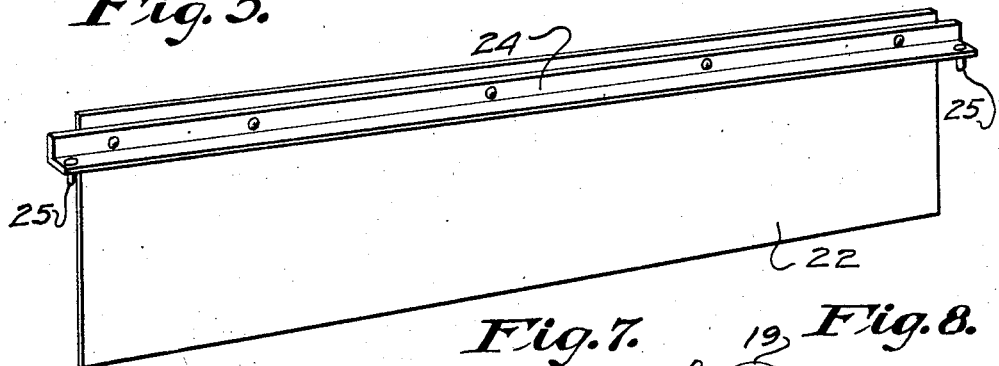
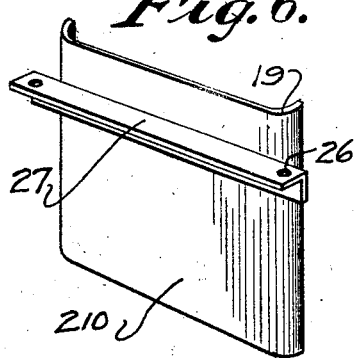
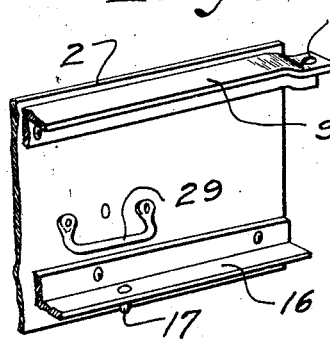
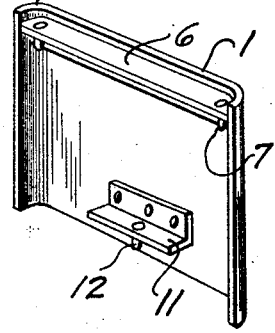
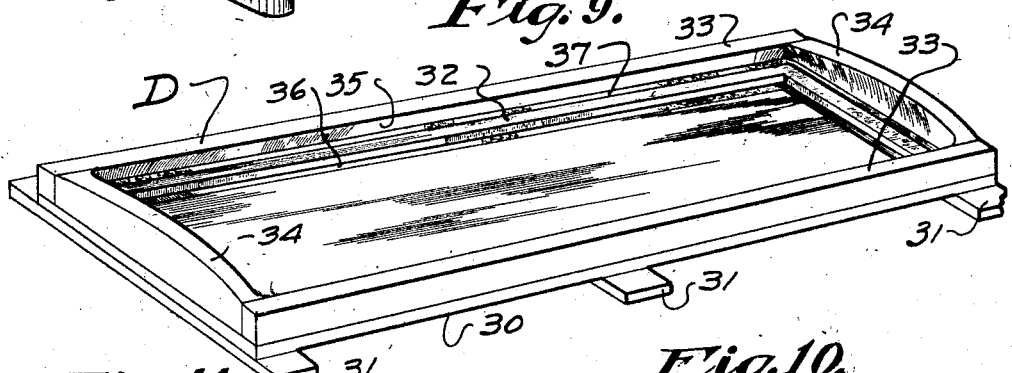
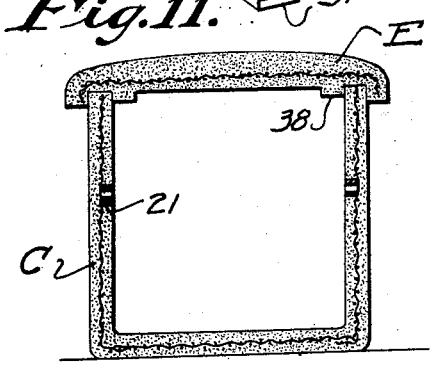
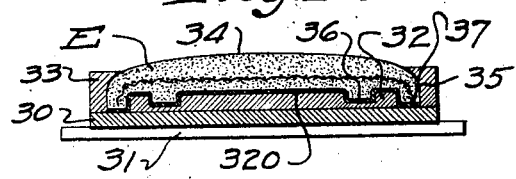
INVENTOR.
WILLIAM P. REIBOLDT
BY Everett H. Rook,
ATTORNEYS.

Patented Mar. 17, 1925.

1,530,328

UNITED STATES PATENT OFFICE.

WILLIAM P. REIBOLDT, OF IRVINGTON, NEW JERSEY.

APPARATUS FOR MOLDING BURIAL VAULTS.

Application filed June 14, 1921. Serial No. 477,398.

*To all whom it may concern:*

Be it known that I, WILLIAM P. REIBOLDT, a citizen of the United States, and a resident of Irvington, in the county of Essex and State of New Jersey, have invented certain Improvements in Apparatus for Molding Burial Vaults, of which the following is a specification.

This invention relates in general to apparatus for casting or molding containers of plastic material and more particularly to the casting or molding of burial vaults of concrete.

The objects of the invention are to provide an improved apparatus for the purpose described whereby containers or burial vaults can easily and quickly be cast or molded at a greatly reduced cost; to provide an improved sectional or knock-down molding apparatus which can be quickly set up or disassembled; to provide a novel and improved sectional hollow core constructed of sheet metal shaped to conform to the interior of the container to be molded, a base upon which the core can be quickly positioned and assembled and a detachable outer mold wall to be set up on said base in spaced relation to said core and extending above the same; to provide improved means for connecting the sections of said core and said outer mold wall; to provide novel and improved means for positioning and supporting said core and mold wall upon said base, and to obtain other results and advantages as may be brought out by the following description.

Referring to the accompanying drawings, in which like numerals of reference indicate the same parts throughout the several views, Figure 1 is a vertical longitudinal sectional view through a mold for forming containers or burial vaults in accordance with my invention;

Figure 2 is a horizontal sectional view through the same taken on the line 2—2 of Fig. 1;

Figure 3 is a transverse vertical sectional view taken on the line 3—3 of Fig. 2, showing the plastic material of which the container is formed within the mold walls;

Figure 4 is a sectional view similar to Fig. 3 with the mold walls and container inverted, showing the manner of disassembling the mold walls and removing the same from the container;

Figure 5 is a detached perspective view of one of the side plates of the outer mold wall;

Figure 6 is a similar view of one of the end plates of the outer wall;

Figure 7 is a fragmentary perspective view of the inside of one end of one of the side plates of the core;

Figure 8 is a similar view of one of the end plates of the core;

Figure 9 is a perspective view of the mold for forming the cover of the container;

Figure 10 is a transverse sectional view through the mold shown in Figure 9 with the plastic material of which the cover is formed within the mold, and Figure 11 is a transverse vertical sectional view through a completed burial vault.

In forming containers or burial vaults in accordance with my invention the container is molded or cast bottom side up within mold walls formed by a hollow core shaped to conform to the interior of the container and an outer mold wall arranged in spaced relation to the core, the core having a closed top and the outer mold walls being as much higher than the top of the core as the thickness of the bottom of the container.

In the drawings the reference character A designates the hollow core which is shaped to conform to the interior of the container and is formed with end plates 1, side plates 2 and a top plate 3. The end plates 1 and side plates 2 are adapted to be positioned edgewise in a vertical plane upon a base 4, the said plates 1 and 2 being properly positioned upon the base 4 by means of cleats 5 secured to the base against the outer sides of which are placed the plates 1 and 2, as clearly shown in Figures 1 and 3. The upper edges of the plates 1 and 2 are connected by angle bars 6 riveted to the insides of the end plates 1 and provided at their ends with downwardly projecting dowel pins 7 adapted to pass through openings 8 in the ends of similar angle bars 9 secured to the insides of the side plates 2. The angle bars 6 and 9 are spaced from the top edges of the plates 1 and 2 in order to form supports for the top plate 3 which is arranged within the plates 1 and 2 as shown in Figures 1 and 3, and the extremities of the angle bars 9 are offset downwardly as at 10 in order to allow the ends of the angle bars 6 to overlap and rest upon the same with the horizontal flanges of the angle bars 6 and 9 in substantially a common plane. Adjacent their lower edges the end plates 1 are formed with short angle bars 11 which are provided in their horizontal flanges with dowel pins 12 adapted to fit into openings 13 formed in the ends of a longitudinal strap 14 which is secured adjacent its ends to similar transverse straps 15, the said straps 14 and 15 being rigidly secured to the base 4. The side plates 2 are provided adjacent their lower edges with angle bars 16 provided in their horizontal flanges with pins 17 to fit into openings 18 formed in the ends of the transverse straps 15. The side edges of the end plates 1 are preferably curved as at 19, and are adapted to abut against the ends of the side plates 2, as clearly shown in Figure 2, the said curved portions 19 serving to form curved corners on the interior of the container. With the core A thus assembled it will be seen that it is substantially rigid in construction and is positively held in position upon the base 4 by the cleats 5 and the pins 12 and 17 engaging the straps 14 and 15. The outer sides of the side plates 2 are formed with pins 20 projecting laterally therefrom which are adapted to loosely receive short lengths of pipe 21.

The outer wall B of the mold comprises ends 210 and sides 22 which are adapted to be positioned upon the base 4 in vertical planes and in spaced relation to the core A, as shown in Figures 1 and 2, the lower edges of said ends and sides of the outer wall B being arranged within positioning cleats 23 similar to the cleats 5. The upper edges of the ends 21 and sides 22 are connected by angle bars 24 secured to the outer sides of the side walls 22, the ends of which project beyond the ends of said side walls and are formed in their horizontal flanges with pins 25 which are adapted to fit into openings 26 in the ends of similar but reversely arranged angle bars 27 secured to the end walls 210. The upper edge of the outer wall B projects upwardly beyond the top plate 3 of the core A a distance equal to the thickness of the bottom of the container, and the spaces between the ends and sides of the core and outer wall are equal to the thickness of the walls of the container which it is desired to form.

In molding a container the core A and outer mold wall B are set up on the base 4 as above described and suitable reenforcing material 28 is positioned in the space between the ends and sides of the core and outer wall and above the top plate 3. The plastic material, for instance concrete, is then poured into the spaces between the core and outer walls and over the top plate 3 of the core until the plastic material is substantially flush with the upper edges of the outer wall B. The plastic material is then allowed to set and harden for the necessary period of time after which the mold walls are removed. It will thus be seen that the plastic material in the space between the top plate 3 of the core and the upper edges of the outer wall B forms the bottom of the container C, the base 4 enclosing the top of the container.

In disassembling the mold walls to remove the container therefrom the container and mold walls are inverted, as shown in Figure 4, and the base 4 is lifted off. This disconnects the straps 14 and 15 from the side plates 2 and end plates 1 of the core. The side plates 2 of the core are then pulled inwardly away from the wall of the container, as shown in Figure 4, and lifted vertically out of the container, handles 29 being preferably provided for so handling the side plates. This removes the angle bars 9 from the pins 7 and the end plates 1 and top 3 can then be removed. The outer wall B is removed by simply raising the end walls 210 thereof vertically to disengage the pins 25 from the angle bars 27, after which the side walls 22 can be removed. In removing the side plates 2 of the core A the pins 20 in the sides thereof slip out of the short lengths of pipe 21 leaving the pipe within the walls of the container, as shown in Figure 4, the said pieces of pipe serving as sockets on the interior of the container of the vault to receive hoisting apparatus for handling the same.

For molding the cover of the container or vault I utilize a mold D comprising a base 30 supported on transverse cleats 31 spaced longitudinally thereof, the said base having a core or former plate 32 on the upper side thereof which is formed with a continuous groove 36 spaced inward from the sides and ends of said former plate. A wall 33 is detachably mounted on said base and surrounds said former plate in spaced relation to the edges thereof to form a peripheral depression 37, and the entire bottom of the mold including the former plate, the groove 36 and the bottom of the depression 37 is covered with a sheet of metal 320. The wall 33 is of a height equal to the thickness which it is desired to form the cover E of the container, the ends 34 being arched or curved and the inner sides of said wall being concave as at 35. The plastic material is poured into the mold around the projection 32 until the top of the material is substantially flush with the upper edges of the wall 33, as shown in Figure 10, the plastic material being rounded at the top to conform to the arched ends 34 to form the cover with a transversely rounded top. The projection 32 and the spaces 37 between the sides thereof and the wall 33 serve to form the flange on the cover E, while the groove 36 forms a rib 38 on the inner side of the cover.

The apparatus above illustrated and described is particularly designed for the molding or casting of burial vaults of concrete, and in Figure 11 I have illustrated the completed vault which may be constructed in accordance with my invention. The cover is adapted to rest upon the edges of the walls of the vault C with the said edges received between the flange and rib 38 on the cover, the said cover being sealed upon the vault in any suitable manner.

While I have shown and described one possible embodiment of my invention, it will be understood that this is only for illustrating the principles thereof, and that many modifications and changes can be made in the construction and use of the invention without departing from the spirit or scope thereof. Therefore, I do not desire to be understood as limiting myself except as required by the following claims when construed in the light of the prior art.

Having thus described the invention, what I claim is:

1. A mold including a base, a core comprising side and end plates adapted to be supported edgewise on said base, said plates and said base having cooperating projections and recesses to hold said plates against lateral movement on said base, said plates being also formed at one side adjacent their upper edges with cooperating projections and recesses to connect said plates to each other, all of said projections and recesses engaging on edgewise movement of said plates, and a top plate supported by said second-mentioned projections within said side and end plates, and an outer wall member including side and end plates arranged edgewise on said base in spaced relation to said core, said plates being provided on their outer sides with cooperating projections and recesses to engage on edgewise movement of said plates and connect said plates to each other.

2. A mold including a base, a core comprising side and end plates adapted to be supported edgewise on said base, each of said plates having an angle bar secured by one flange thereto, the projecting flanges of said bars and said base having cooperating projections and recesses to engage upon edgewise movement of said plates to hold said plates against lateral movement on said base, each of said plates having at one side adjacent its upper edge a second angle bar secured by one flange thereto, said second-mentioned angle bars of said end plates being adapted to overlie the ends of said angle bars on the side plates, the adjacent ends of all of said second-mentioned angle bars having cooperating projections and recesses to engage upon edgewise movement of said end plates and hold all of said plates together, a top plate supported on the projecting flanges of said second-mentioned angle bars, and an outer wall including side and end plates arranged edgewise on said base in spaced relation to said core, said plates each having an angle bar secured by one flange thereto with its ends adapted to overlap the ends of the bars on adjacent plates and formed with cooperating projections and recesses to engage upon edgewise movement of said side plates to connect said plates.

3. A mold comprising a base, a former plate on the upper side thereof having a continuous groove spaced inward from the sides and ends of said former plate, a wall surrounding said former plate in spaced relation to the edges thereof to form a peripheral depression between said wall and said former plate, and a sheet of metal arranged over said former plate, said groove and the bottom of said peripheral depression.

WILLIAM P. REIBOLDT.